United States Patent
Zenchelsky et al.

(10) Patent No.: US 6,233,686 B1
(45) Date of Patent: *May 15, 2001

(54) SYSTEM AND METHOD FOR PROVIDING PEER LEVEL ACCESS CONTROL ON A NETWORK

(75) Inventors: Daniel N. Zenchelsky; Partha P. Dutta, both of San Jose; Thomas B. London, Mountain View; Dalibor F. Vrsalovic, Sunnyvale, all of CA (US); Karl Andres Siil, Montgomery Township, Somerset County, NJ (US)

(73) Assignee: AT & T Corp., New York, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/785,501

(22) Filed: Jan. 17, 1997

(51) Int. Cl.[7] .................................................. G06F 13/00
(52) U.S. Cl. ............................................................ 713/201
(58) Field of Search ................................ 395/186, 187.01, 395/188.01, 200.5, 200.54; 713/200, 201, 202, 160, 161, 166, 167; 709/220, 229

(56) References Cited

U.S. PATENT DOCUMENTS

| | | | |
|---|---|---|---|
| 5,473,607 | * 12/1995 | Hausman et al. | 370/85.13 |
| 5,606,668 | * 2/1997 | Shwed | 395/187.01 |
| 5,623,601 | * 4/1997 | Vu | 395/187.01 |

FOREIGN PATENT DOCUMENTS

| | | | |
|---|---|---|---|
| 0762707A2 | * 3/1997 | (EP) . | |
| 0 762 707 A2 | * 8/1997 | (EP) . | |
| 0 762 707 A3 | * 8/1997 | (EP) . | |
| 96/00549 | * 2/1996 | (WO) . | |
| WO 96/05549 | * 2/1996 | (WO) . | |

OTHER PUBLICATIONS

Stevenn M. Bellovin and William R. Cheswick, "Network Firewalls", 2460 IEEE Communications Magazine, 32 (1994), Sep., No. 9, New York, US, pp. 50–57.*

Bellovin, S..M., "Network Firewalls", IEEE Communications Magazine, vol. 32, No. 9, Sep. 1, 1994, pp. 50–57, XP000476555; p. 52, col. 1, In. 60; p. 54, col. 2, In. 30.*

* cited by examiner

*Primary Examiner*—James P. Trammell
*Assistant Examiner*—P Elisca
(74) *Attorney, Agent, or Firm*—Kenyon & Kenyon

(57) ABSTRACT

A system and method for providing peer-level access control on networks that carry packets of information, each packet having a 5-tuple having a source and destination address, a source and destination port, and a protocol identifier. The local rule base of a peer is dynamically loaded into a filter when the peer is authenticated, and ejected when the peer is loses authentication. The local rule base is efficiently searched through the use of hash tables wherein a hashed peer network address serves as a pointer the peer's local rules. Each rule comprises a 5-tuple and an action. The action of a rule is carried out on a packet when the 5-tuple of the rule corresponds to the 5-tuple of the packet.

17 Claims, 7 Drawing Sheets

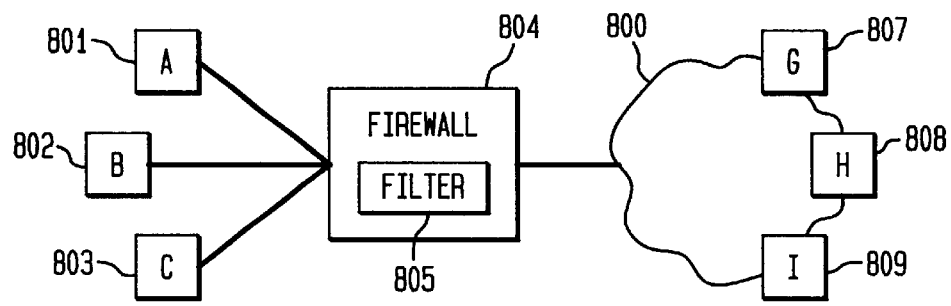
FIG. 8A
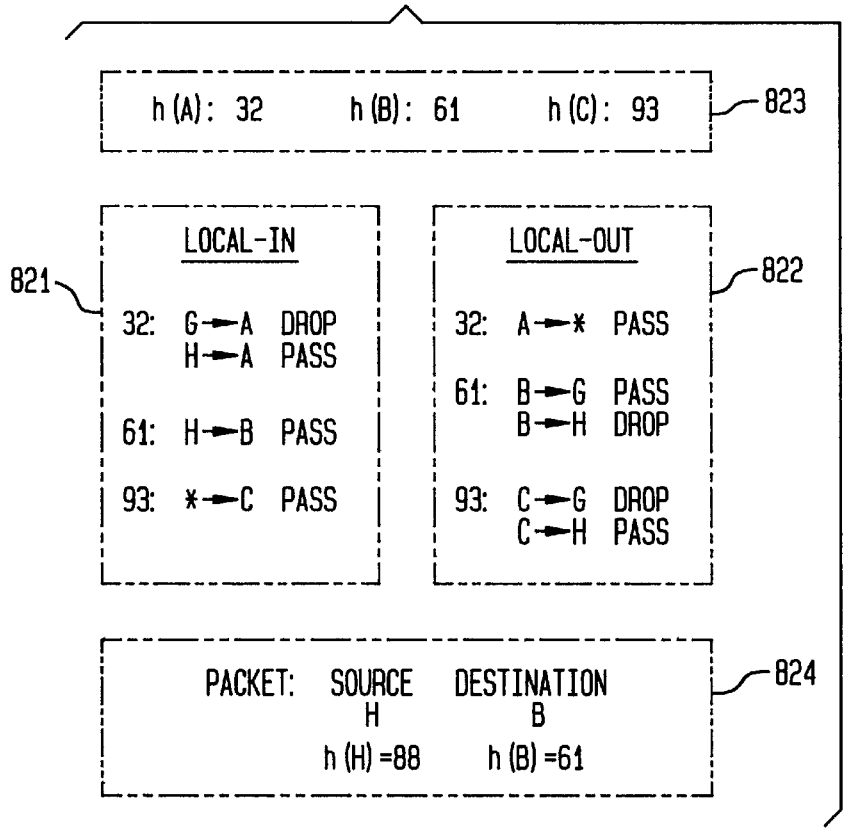
FIG. 8B
A:  A→* PASS      B:  B→G PASS      C:  *→C PASS
    G→A DROP          B→H DROP          C→G DROP
    H→A PASS          H→B PASS          C→H PASS
FIG. 8C

SYSTEM AND METHOD FOR PROVIDING PEER LEVEL ACCESS CONTROL ON A NETWORK

FIELD OF THE INVENTION

This invention relates to information systems security, in particular to providing access control between one set of automated information systems and another.

BACKGROUND OF THE INVENTION

Known methods for implementing access control for a specific computer on a network are cumbersome and inflexible because access rules must be coded and entered by hand by a system administrator. This is impractical for networks whose members change frequently, or whose members' security needs change frequently.

Effective information systems security prevents the unauthorized disclosure, modification or execution of an automated information system's (AIS) data and processes. As used here, the term AIS refers to a computer, network of computers, internetwork of computers, or any subset thereof. The term "data" refers to any information resident on an AIS, including files and programs. The term "processes" refers to programs in any stage of execution on an AIS.

A "host" is a computer with an assigned network address, e.g., an Internet Protocol (IP) address. A "user" is a computer that does not have a fixed, assigned network address. To obtain connectivity to the Internet, for example, a user must commonly obtain a temporary IP address from a host with a pool of such addresses. Such a temporary IP address is retained by the user only for the duration of a single session of connectivity with the Internet.

Information flows in certain networks in packets. A "packet" is a quantum of information that that has a header containing a source and a destination address. An example of a packet is an IP packet. Packets such as IP packets have a network protocol identifier ("protocol") as a part of packet header. The protocol identifies the version number of the protocol used to route the packet. An example of a network protocol identifier is the IP protocol field in an IP packet header.

Packets on a network are directed to and from ports. A "port" is a logical address within a computer through which a process executing on the computer communicates with other executing processes. These other processes may reside on the same computer, or on other networked computers.

Information systems security is implemented by means of a security policy, which comprises rules directed towards regulating the flow of information in an AIS. The rules of a security policy are embodied in a "rule base," a set of rules that specify whether a packet should be passed to the intended recipient or dropped based upon the packet's identifier. A packet identifier is data generally carried in the packet header that serves to identify the packet. An example of a packet identifier is a circuit number, which occurs in the headers of packets flowing in connection-oriented (i.e., circuit-switched) packet switched networks. Another example of a packet identifier is a packet 5-tuple, which is the packet's source and destination address, source and destination port, and protocol. Packets with 5-tuples flow in connectionless packet switched networks.

A rule base may be global or local. A global rule base is a uniform set of rules ("global rules") that apply to a group of users, hosts, or both. A local rule base is a set of rules ("local rules") that apply to a single user with a temporary network address or a host. A single user with a temporary network address or a host that has its own rule base is called a "peer."

Another means for implementing security policy is to restrict access to a network to a predetermined set of users and hosts. When a user or host requests access, its identity must be established and verified before access is granted. This process implicates two steps: identification and authentication.

FIG. 1 shows one method of identification and authentication in the form of a flow chart with each step designated by a reference numeral. A first step requires a source of information to identify itself by name by supplying a string of data called a user id 10. To prevent an imposter from obtaining the privileges associated with a given user id, the user behind the user id is verified by requiring it to provide a password 11 that is normally kept confidential. Such verification is called "authentication." The AIS checks the combination of source id and password against a list of valid users, 12. When the AIS recognizes a valid user id and corresponding password, a user or host is said to have been identified and authenticated 14. Otherwise, the request for access is denied 13. Hereinafter, a source that has been identified and authenticated will be said to have been "authenticated" for purposes of brevity.

A security policy rule base is implemented on a network using a device called a filter comprising hardware and software. The rule base is loaded into the filter, which receives packets en route (between their source and destination) and checks the identifier of each packet against the identifier contained in each rule of the rule base for a match, i.e., if the packet corresponds to the rule. A packet corresponds to a rule if the rule applies to the packet. Hence, a rule that is meant to apply to packets with a circuit number of 3254, for example, "corresponds" to all packets with a packet identifier that indicates circuit number 3254. If the network packet identifier corresponds to a rule identifier, the filter carries out the PASS or DROP action prescribed by the rule on the packet. If the PASS action is carried out, the packet is allowed to pass through the filter. If the DROP action is carried out, the packet is eliminated.

A filter is often combined with other hardware and software that helps manage the flow of information through the filter. The combination of hardware and software that carries out and supports packet filtering is called a firewall. A firewall is often positioned between a first network that "owns" the firewall and a second network. The purpose of the firewall is to regulate the flow of information into and out of the first network from the second network by implementing the rule base belonging to the first network for all such information.

A typical application of a firewall is shown in FIG. 2. A corporate network 20 may wish to provide access to Internet hosts 21 to its subscribers, but may wish to limit the access that the Internet hosts 21 have to the corporate network 20, which may contain trade secrets and proprietary information. The corporate network 20 would develop a security policy implemented by a firewall 22 placed at the interface between the corporate network 20 and the Internet hosts 21. The firewall 22 comprises a filter 23 that would PASS or DROP packets from Internet hosts 21 to corporate network subscribers 20 and vice versa based upon the packets' source and destination addresses. The firewall is said to belong to the corporate network, and enforces rules that "protect" hosts within the corporate network that have IP addresses. Such hosts are said to be "behind" the corporate network firewall.

An example of a rule base for corporate network 20 having hosts A 24, B 25 and C 26, connected through a firewall 22 to the Internet having hosts G 27, H 28 and I 29 is as follows:

| SOURCE<br>Address, Port | DESTINATION<br>Address, Port | VERSION | ACTION |
|---|---|---|---|
| A,21 | G,32 | 4 | PASS |
| A,22 | H,19 | 3 | DROP |
| G,11 | A,64 | 4 | DROP |
| C,9 | I,23 | 4 | PASS |

Every rule base must also have a default action for transactions that are not explicitly specified in the rule base, which is usually the DROP action. Thus, packets from system A,21 to system G,33 will be dropped because the above rule base does not expressly include a rule for such a transfer.

A typical architecture for providing users access to the Internet is shown in FIG. 3. Users 31 and 32 do not have fixed IP addresses. Rather, a user is assigned temporary IP addresses by an Internet Service Provider (ISP) Point of Presence (POP) 33 from a pool of such addresses kept by the POP 33 for this purpose. A POP comprises at least one host (not shown). When a user 31 terminates his session of access to the Internet 35, the IP address is returned to the POP 33. Thus, over successive access sessions, a user 31 is likely to have several different IP addresses.

Known filters are not well suited to providing appropriate access control for networks such as a POP. This is because a known filter is only able to load and store rules through the intervention of a system administrator, a slow and cumbersome process. Indeed, the system administrator generally must hand-code rules in a format specific to the filter platform. With known filters, it is impractical to implement the access rules of a specific user (known as the user's "local rules") who is accessing and leaving the network with changing network addresses.

This problem is illustrated in FIGS. 5a and 5b. FIG. 5a shows a first session where a first user 51 has requested Internet access and been authenticated by a POP and been assigned IP address B from the POP IP address pool 52. Likewise, a second user 53 has been authenticated and been assigned IP address E from the pool 52. A rule base 53 is loaded into a filter to regulate the flow of information between users 51 and 53 and the hosts P, U, V and W on the Internet. The rule base shown in FIGS. 5a and 5b show only the source and destination addresses for each rule, and omit source and destination ports and protocol for simplicity.

Both users stop accessing the Internet and then later request access again and are authenticated for a second session, shown in FIG. 5b. This time, the first user 51 is assigned IP address E from the pool 52, and the second user is assigned IP address A. With the newly assigned network addresses, the rule base in the filter is now out of date, containing no rules for the second user, and the wrong rules for the first user, which has been assigned the IP address assigned to the second user during the first session. Even if both users had fortuitously been reassigned the same IP addresses for their second sessions, if either user's security needs had changed between sessions, a new rule base would have had to be loaded into the filter. As discussed above, loading rules into known filters is tedious. Loading and dropping such rules with the frequency that users access and leave a POP is impractical for known filters.

The inflexibility of known filters often necessitates the implementation of rule bases that are too broad for a given application. Without the possibility of easy updates, it is simpler to mandate global rules that apply to all AIS behind a filter rather than to load rules that apply to specific hosts. In such a case, all AIS behind the filter must conform to the most restrictive security requirements of any such AIS, resulting in overly restrictive filtering.

The shortcomings of known filters are illustrated by some of the architectures presently used to provide information systems security for a POP. The architecture shown in FIG. 3 provides a minimal level of security through an authentication system 34 which limits access to a predetermined list of authenticated users. But the list of users must generally be entered by hand by the system administrator, and so cannot be easily changed. Further, once access is granted, the access is unlimited. Information may flow to and from users 31 and 32 from the Internet 35 without regulation, providing no security past the initial authentication process. This exposes users 31 and 32 to the risk of hacker attacks from users and hosts on the Internet, possibly resulting in the theft or unauthorized manipulation of user data.

The architecture illustrated in FIG. 4 shows another known solution to providing information systems security on a POP. The known filter 46 implements a security policy for packets flowing between the Internet 45 and hosts 41 and 42. However, the rule base in the filter 46 must still be formulated and loaded by the system administrator. Further, the network addresses of the users 31 and 32 are likely to change on a session by session basis. This means that it is only practical to load general, "global" rules into the filter that are valid for all of the users. Thus, for example, if user A does not wish to receive packets from a particular host on the Internet, the filter rule base must drop all such packets, thus cutting off user B from receiving packets from that Internet host as well. In this way, the global rule base necessitated by the limited capabilities of known filtering systems is almost always too broad. Another disadvantage is that it is difficult to change the filter rule base to accommodate changing security needs of either user 41 or 42.

Another architecture that provides security on for each peer is shown in FIG. 6. Here, filters 66 and 67 are placed between users 61 and 62, respectively, and the POP. Requiring every user to have its own filter is an expensive solution that is impractical to implement.

What is needed is a filtering system and method that accurately and efficiently implements local rule bases on a network whose configuration and security needs are constantly changing. Such an invention would provide peer-level security flexibly and inexpensively, with little intervention required from a system administrator.

SUMMARY OF THE INVENTION

The present invention comprises a filter that efficiently stores, implements and maintains access rules specific to an individual computer on a network with rapidly changing configurations and security needs. This advantageously allows an individual computer (a peer) to implement its security policy on a filter shared by many such computers on a network.

When a local rule base is no longer valid because the peer is no longer authenticated to the filter in accordance with the present invention, the peer's local rule base is "ejected," i.e., a logical operation is carried out at the filter whereby the local rule base is deleted from the filter. This effectively regulates the flow of information on session-by-session basis, which is especially advantageous in AIS where individual users and hosts have different security needs that change from time to time. For example, the present invention is useful for implementing a parental control system wherein a parent is able to regulate the access to certain types of licentious material on the Internet for household Internet access accounts.

The present invention allows a single device to flexibly and efficiently regulate the flow of information in accordance with security policies that are specifically tailored to the individual user or host. Advantageously, no intervention on the part of the system administrator is ordinarily required in the ordinary functioning of the present invention. Unlike known filters, the present invention is able to accommodate users with temporary network addresses as easily as hosts with fixed network addresses.

In accordance with the present invention, each individual peer is authenticated upon requesting network access. The peer's local rule base is then loaded into the filter of the present invention, either from the peer itself, or from another user, host or peer. When the peer is no longer authenticated to the POP (e.g., the peer loses connectivity or logs off from the POP), the peer's local rule base is ejected (deleted)from the filter.

BRIEF DESCRIPTION OF THE DRAWINGS

FIG. 7b shows an implementation of the rule base architecture shown in FIG. 7a.

FIG. 8a shows a POP with a filter and an authentication system that provides access to the Internet to three peers.

FIG. 8b shows a simplified depiction of the rule bases belonging to the peers shown in FIG. 8a.

FIG. 8c shows a hash function applied to the network addresses of the three peers shown in FIG. 8a, and the local-in and local-out rule bases.

DETAILED DESCRIPTION

Figure 1:
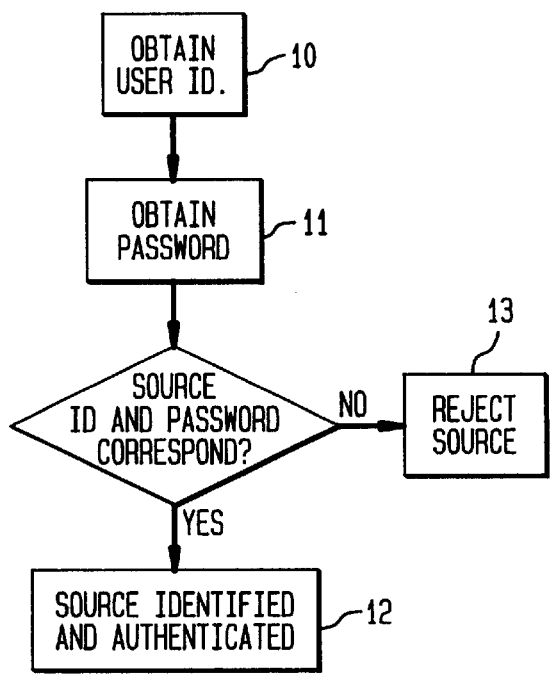
FIG. 1 shows the process of identification and authentication.
Figure 2:
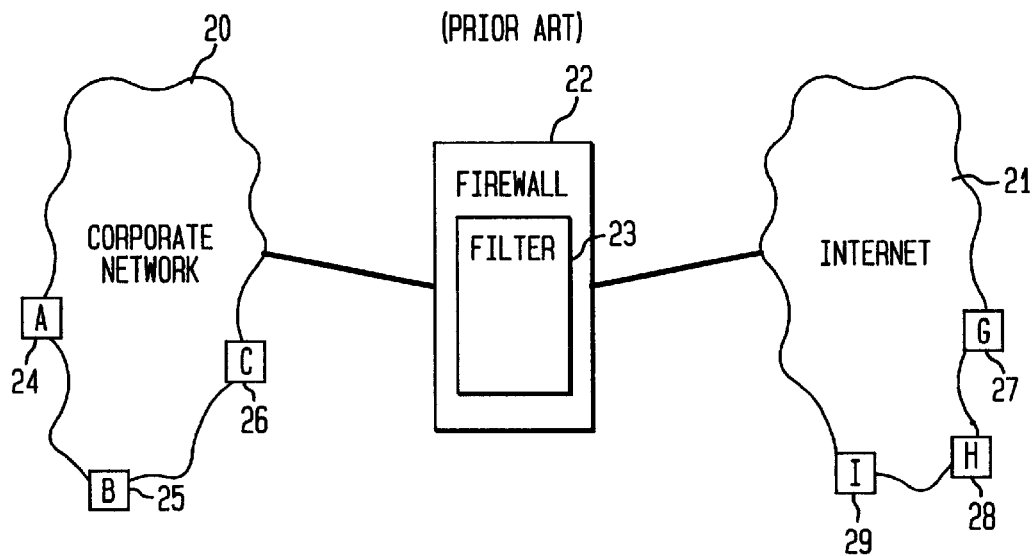
FIG. 2 shows a firewall interposed between a corporate network and the Internet.
Figure 3:
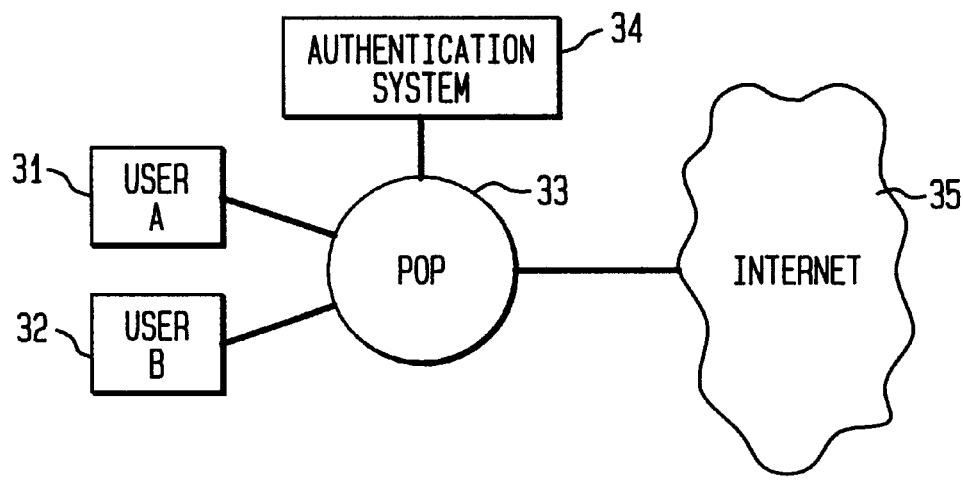
FIG. 3 shows users connected to the Internet through a Point of Presence (POP) having an authentication system.
Figure 4:
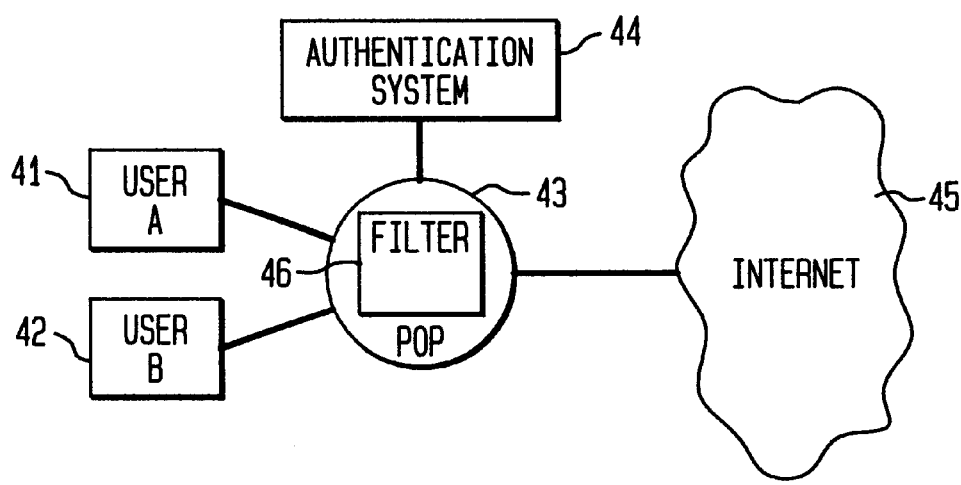
FIG. 4 shows a POP with an authentication system and a filter.
Figure 5A:
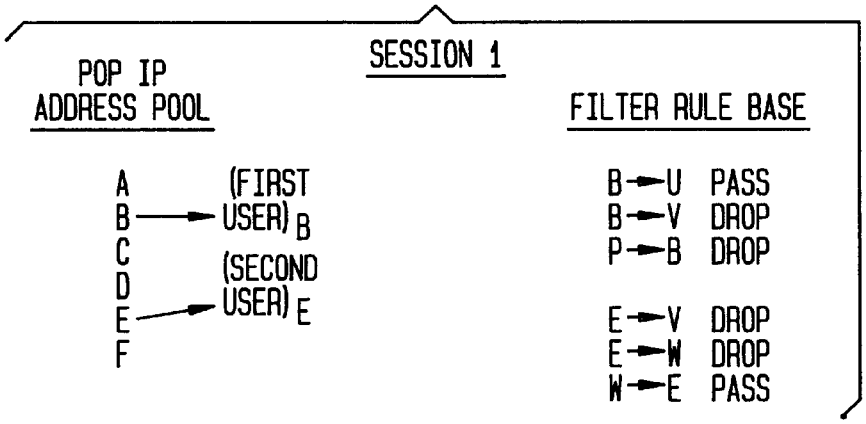
FIG. 5a shows a first Internet access session for two users through a POP having a filter.
Figure 5B:
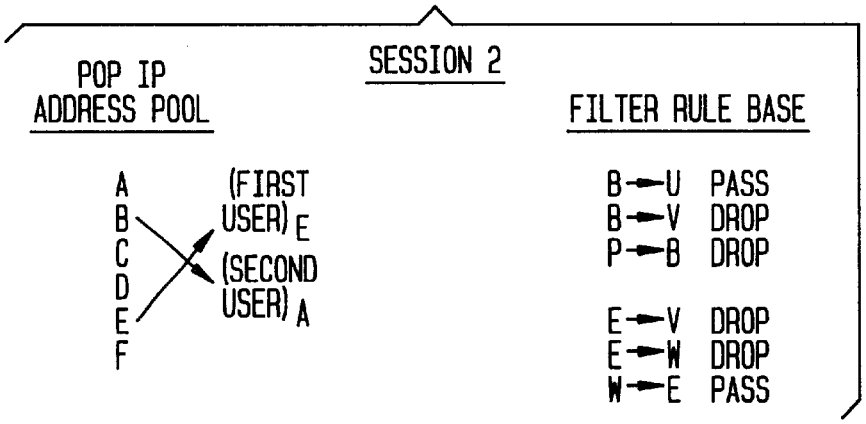
FIG. 5b shows a second Internet access session for two users through a POP having a filter.
Figure 6:
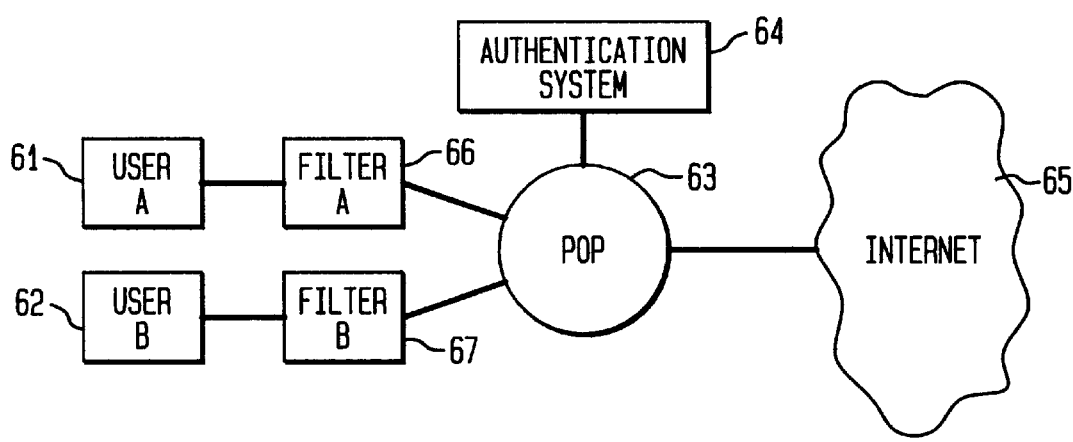
FIG. 6 shows a known method of providing user level access control to the Internet.
Figure 7A:
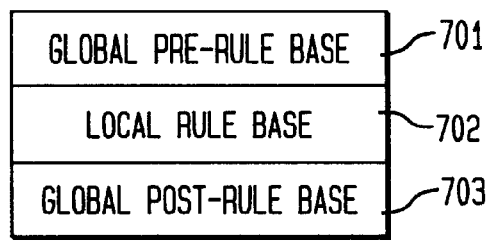
FIG. 7a shows a rule base architecture in accordance with an embodiment of the present invention.

In accordance with the present invention, FIG. 7a shows an embodiment of a rule architecture that incorporates the functionality of known filters by including a global pre-rule base 701, a local rule base 702 and a global post-rule base 703.

The global pre-rule se 701 usually comprises general rules that apply to all hosts behind the firewall, and are most efficiently applied before any local rules. An example of a global pre-rule is that no telnet (remote login) requests are allowed past the firewall.

The local rule base 702 comprises the set of peer rule bases loaded into the filter for authenticated peers. These rule pertain to specific hosts. An example of a local rule is that host A may not receive e-mail from beyond of the firewall.

The global post-rule base 703 comprises general rules that are most efficiently applied after the global pre-rule base and local rule base is searched. A rule applied in the global post-rule base need not have the same effect as if it were applied in the global pre-rule base. Consider the above example prohibiting the reception of certain telnet requests. If this rule is placed in the global post-rule base, the local rule base is searched first, and may contain a rule allowing a telnet request through for a particular peer. If such a rule is found in the local rule base, the global post-rule base is not subsequently searched, and the telnet request is allowed to pass. Consider the different effect of the same rule when it occurs in the global pre-rule base, which is to block all telnet requests for all hosts behind the firewall. The importance of the order of applying rules is evident from a more thorough consideration of the method of the present invention.

Figure 7B:
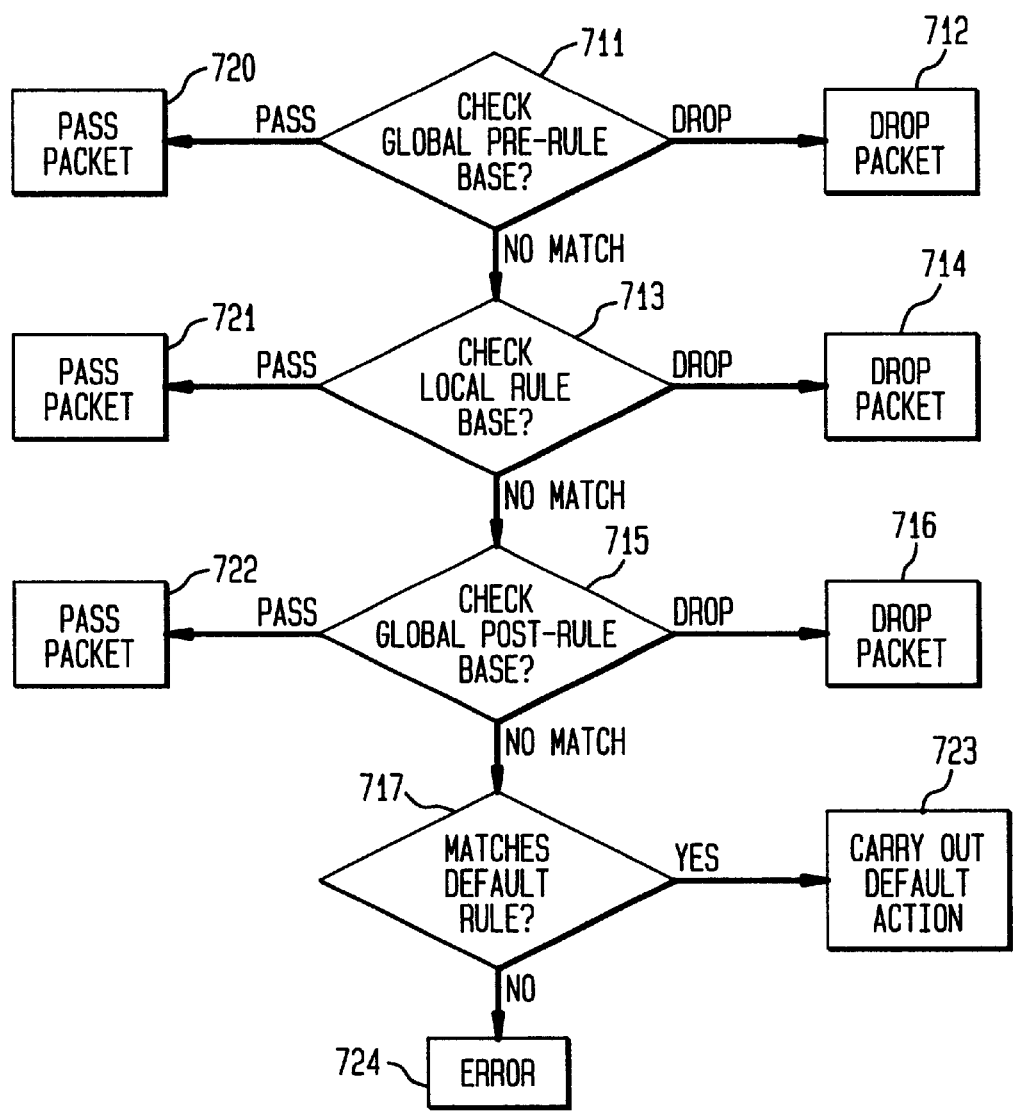

FIG. 7b illustrates a flow chart of packet processing or filtering in accordance with the present invention. As shown therein, a packet entering the filter is first checked against a global pre-rule base 711 containing rules for all hosts and users having network addresses behind the firewall.

If a corresponding rule is found and the prescribed action is DROP, the packet is dropped 712. If a corresponding rule is found and the action is PASS, the packet is passed 720. If no corresponding rule is found, then the local rule base is checked 713.

The local rule base 702 is the set of all per user rule bases that are dynamically loaded upon authentication and ejected upon loss of authentication in accordance with the present invention.

If a corresponding rule is found in the local rule base and the action is DROP, the packet is dropped 714. If a corresponding rule is found and the action is PASS, the packet is passed 721. If no corresponding rule is found, then the global post-rule base is checked 715.

If a corresponding rule is found in the global post-rule base and the action is DROP, the packet is dropped 716. If the action is PASS, the packet is passed 722. If no corresponding rule was found in any of the rule bases, then the packet is checked against the default rule 717, whose action is generally to DROP the packet. If the packet corresponds to the default rule, then the default action is carried out 723. If the packet does not match the default rule, then an error condition occurs 724.

This rule base architecture advantageously retains the functionality of known filters. For example, if there are rules in the global pre- or post-rule base only, the filter behaves the same as known filters. If there are only rules in the local rule base, the filter has all of the new and innovative features of the present invention without having global rules.

It is advantageous to implement the present invention with a system for efficiently searching the local rule base for corresponding rules for a given packet. A system that provides such efficiencies uses a hash function to generate an index for the rules. A hash function maps a string of characters to an integer. As is known in the art, a character string is represented as binary numbers inside a computer. An example of a hash function would be to take the third, fourth and fifth bytes of a character string as it is stored in a computer as the first, second and third digits of an integer to be associated with the string. A string on which a hash function has been carried out is said to be "hashed," and the resulting integer is referred to as the "hash" of the string.

This is carried out by logically dividing the local rules into local-in rules and local-out rules. A local-in rule is any rule that applies to a packet whose destination address corresponds to a network address behind the firewall. For example, suppose a host with network address A is behind the firewall, and hosts B, C and D are outside the firewall. The following are examples of local-in rules for host A, following the format SOURCE ADDRESS, SOURCE PORT→DESTINATION ADDRESS, DESTINATION PORT: Protocol: ACTION:
B,31→A,33:4:DROP
C,64→A,45:4:PASS
D,11→A,17:4:PASS A local-out rule is any rule that applies to a packet whose source corresponds to a network address behind the firewall. Local out-rules for the above example are:
A,44→B,70:4:PASS
A,13→C,64:4:DROP
A,12→D,17:4:DROP In accordance with the present invention, a hash function h is carried out on the network address of the owner of a local rule base. A hash function associates an integer with a string. For the above example in which a host with network address A ("host A") has a local rule base, a hash function would be carried out on A:
h(A)=N, where N is an integer An example of such a hash function is to take the last decimal digit in each octet of an IP address and compose an integer for the hash number. Thus, for example, the IP address 123.4.46.135 would have a hash value of 3465.

After the hash function is carried out, a local-in and a local-out hash table is generated. These tables are essentially indexes searchable on hash numbers derived from network addresses of peers, where each hashed peer network address points to that peer's local-in and local-out rules. Thus, if A is the network address of peer A, and if h(A)=32, then 32 would point to peer A's local-in and local-out rules in the local rule base.

Figure 8D:
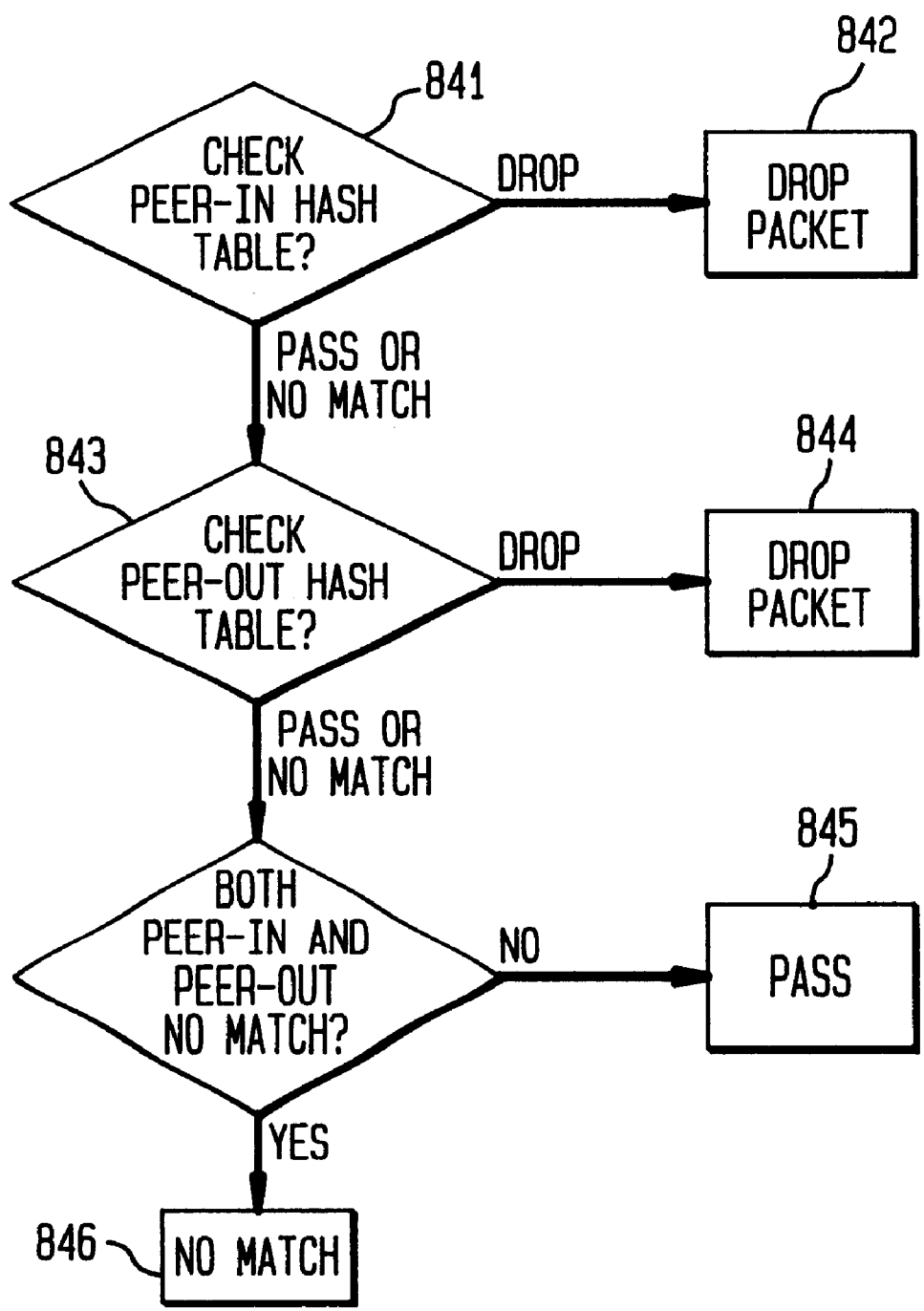
FIG. 8d shows a detailed representation of the box "Check Local Rule Base" shown in FIG. 7b.

The advantages of this indexing system in accordance with the present invention may be demonstrated with the aid of FIGS. 8a, 8b, 8c and 8d. FIG. 8a shows an example architecture where peers A 801, B 802, and C 803 are behind a firewall 804 having a filter 805 connected to a network 806 having hosts G 807, H 808 and I 809. These letters represent network addresses. FIG. 8b shows the local rule base associated with each host. For simplicity, each rule in the rule bases is shown only as a network source and destination address; the source and destination ports and protocol numbers are not shown. The asterisk represents a wildcard indicating any host. For example, this feature may be advantageously implemented in accordance with the present invention by including wildcards in one or more of the four octets that constitute an IP address. The following IP address specifications are all valid for use in rule bases in accordance with the present invention:
123.*.233.2
34.*.*.155
*.*.*.32
*.*.*.*

The wildcard feature may also be used in accordance with the present invention in a similar fashion in any other component in the 5-tuple, i.e., the source and destination ports and the protocol.

FIG. 8c shows the peer-in hash table 821 and peer-out hash table 822 derived from the local rules shown in FIG. 8b and hash function h carried out on network addresses A, B and C 823. When a packet is received by the filter 805, the filter carries out the same hash function h on the packet's source and destination address 824.

FIG. 8d shows the method by which the hash tables are searched in accordance with the present invention. FIG. 8d represents a detailed view of the box "Check Local Rule Base" 713 in FIG. 7b.

In accordance with the present invention, if there was no corresponding rule found in the global pre-rule base 711 (FIG. 7b), then the local-in hash table is efficiently searched for a rule that corresponds to the packet 841. If a corresponding rule is found and the action is DROP, the packet is dropped 842. If the action is PASS or there is no corresponding rule, the peer-out hash table is checked 843. If a corresponding rule in the hash-out table is found and the action is DROP, the packet is dropped 844. If the action is PASS or there is no corresponding rule, and if at least one of the hash tables contained a corresponding rule, the packet is passed 845. If there were no corresponding rules in either hash table 846, then the post-rule base is checked 715 as shown in FIG. 7b.

Were it not for the peer-in and peer-out hash tables, the rules would have to be searched far less efficiently by searching the entire rule base for rule identifiers (e.g., 5-tuples) that match the packet identifier (e.g., 5-tuple.) The part of the rule that identifies the packet to which the rule applies (the rule identifier) is also called the rule "key." Using hash tables eliminates the need to search the keys of all rules, pointing instead to the relevant subset of possibly applicable rules through a speedier search. Thus, the scope and computational time needed to carry out the search is substantially and advantageously reduced, reducing the delay in packet transit time caused by the interposition of a filter between the packet source and destination.

Figure 9:
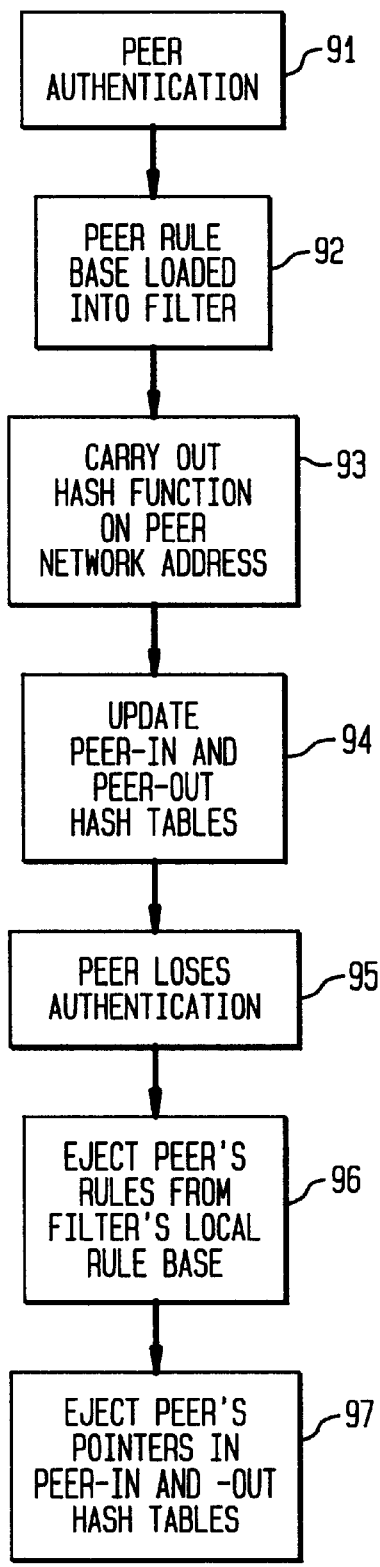
FIG. 9 shows an implementation of the present invention.

As shown in FIG. 9, a peer is first authenticated 91 in accordance with the present invention. Upon authentication, the peer's local rule base is loaded into the filter 92. A hash function is carried out on the peer's network address 93, and the filter's peer-in and peer-out hash tables are updated 94 with pointers to the peer's peer-in and peer-out rules. When the peer is no longer authenticated 95, the peer's local rules are ejected from the filter local rule base 96, and the pointers to the peer's peer-in and peer-out rules are ejected from filter's peer-in and peer-out hash tables 97.

The present invention provides new security functionality on a per user basis to filters and firewalls, while maintaining the functionality of known filters. The present invention allows for the dynamic adjustment of local rule bases that can be dynamically tailored to meet the changing needs of the individual user.

What is claimed is:

1. A filter for providing peer level access control on a network having a peer with a local rule base, wherein said filter comprises:
   a. means for accessing a peer's local rule base;
   b. means for detecting when the peer is authenticated;
   c. means for loading a rule from the peer's local rule base at the filter when the authentication of the peer is detected;
   d. means for receiving a packet having a packet identifier, identifying a corresponding local rule, and carrying out the action of the corresponding local rule on the packet while said filter is filtering packets for the peer, and
   e. a global pre-rule base having a global pre-rule, wherein upon receiving the packet, said filter first searches said global pre-rule base for a rule that corresponds to the packet and carries out the action of the corresponding global pre-rule on the packet, and wherein if no corresponding global pre-rule is identified, the filter searches the local rule base for a rule that corresponds to the packet and carries out the action of the corresponding local rule on the packet.

2. The filter of claim 1, further comprising:

f. means for detecting when the peer logs off; and g. means for ejecting said local rule base from said filter upon detecting that the peer has logged off.

3. The filter of claim 1, wherein the packet identifier comprises a source and destination address, a source and destination port, and a protocol identifier.

4. The filter of claim 1, wherein said means for accessing the local rule base comprises receiving and storing the local rule base.

5. The filter of claim 1, further comprising means for authenticating the peer.

6. A filter for providing peer level access control on a network having a peer with a local rule base, wherein said filter comprises:

a. means for accessing a peer's local rule base;

b. means for detecting when the peer is authenticated;

c. means for loading a rule from the peer's local rule base at the filter when the authentication of the peer is detected;

d. means for receiving a packet having a packet identifier, identifying a corresponding local rule, and carrying out the action of the corresponding local rule on the packet while said filter is filtering packets for the peer, and e. a global post-rule base, wherein the global post-rule base is searched for a rule that corresponds to the packet, and the action of a global post-rule is carried out if it corresponds to the packet only if no corresponding rule in said global pre-rule base and no corresponding rule in said local rule base are identified.

7. The filer of claim 6, further comprising:

f. means for detecting when the peer logs off; and g. means for ejecting said local rule base from said filter upon detecting that the peer has logged off.

8. The filter of claim 6, wherein the packet identifier comprises a source and destination address, a source and destination port, and a protocol identifier.

9. The filter of claim 6, wherein said means for accessing the local rule base comprises receiving and storing the local rule base.

10. The filter of claim 6, further comprising means for authenticating the peer.

11. A filter for providing peer level access control on a network having a peer with a local rule base, wherein said filter comprises:

a. means for accessing a peer's local rule base;

b. means for detecting when the peer is authenticated;

c. means for loading a rule from the peer's local rule base at the filter when the authentication of the peer is detected;

d. means for receiving a packet having a packet identifier, identifying a corresponding local rule, and carrying out the action of the corresponding local rule on the packet while said filter is filtering packets for the peer, and e. a default rule, wherein if no corresponding pre-global rule and no corresponding local rule and no corresponding post-global rule are identified, said filter carries out the action of said default rule if said default rule corresponds to the packet, and generates an error condition if said default rule does not correspond to the packet.

12. The filer of claim 11, further comprising:

f. means for detecting when the peer logs off; and g. means for ejecting said local rule base from said filter upon detecting that the peer has logged off.

13. The filter of claim 11, wherein the packet identifier comprises a source and destination address, a source and destination port, and a protocol identifier.

14. The filter of claim 11, wherein said means for accessing the local rule base comprises receiving and storing the local rule base.

15. The filter of claim 11, further comprising means for authenticating the peer.

16. A method for providing peer-level access control on a network with a peer, said method comprising:

a. receiving a packet having a packet identifier;

b. searching a global pre-rule base and identifying a global pre-rule that corresponds to the packet;

c. carrying out the action of a global pre-rule if the global pre-rule corresponds to the packet;

d. loading a local rule base of a peer when the peer is authenticated;

e. if no corresponding global pre-rule is found in the global pre-rule base, searching the local rule base, identifying a local rule that corresponds to the packet, and carrying out the action of a local rule if the local rule corresponds to the packet;

f. ejecting the local rule base from the filter;

g. if no corresponding global pre-rule is found in said global pre-rule base and no corresponding local rule is found in said local rule base, searching a global post-rule base for a global post-rule that corresponds to the packet; and h. carrying out the action of a global post-rule if the global post-rule corresponds to the packet.

17. The method of claim 16, further comprising the steps of:

i. if no corresponding rule is found in the global pre-rule base and no corresponding rule is found in the local rule base, and no corresponding rule is found in the global post-rule base, determining if the packet corresponds to a default rule; and j. carrying out the action of the default rule if the default rule corresponds to the packet, and generating an error condition if the default rule does not correspond to the packet.

* * * * *